(12) United States Patent
Soechting et al.

(10) Patent No.: US 7,552,647 B2
(45) Date of Patent: Jun. 30, 2009

(54) TURBINE BLADE FATIGUE LIFE EVALUATING METHOD

(75) Inventors: Friedrich Soechting, Miami, FL (US); Charles Ellis, Miami, FL (US); Yasuoki Tomita, Takasago (JP); Yugo Tokunaga, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 386 days.

(21) Appl. No.: 11/246,137

(22) Filed: Oct. 11, 2005

(65) Prior Publication Data
US 2006/0201257 A1 Sep. 14, 2006

Related U.S. Application Data

(60) Division of application No. 10/635,494, filed on Aug. 7, 2003, now Pat. No. 6,983,659, which is a continuation-in-part of application No. 10/347,923, filed on Jan. 22, 2003, now abandoned.

(51) Int. Cl.
*G01M 15/00* (2006.01)
(52) U.S. Cl. ........................................................ 73/802
(58) Field of Classification Search ........................ None
See application file for complete search history.

(56) References Cited

U.S. PATENT DOCUMENTS

| | | |
|---|---|---|
| 1,532,297 A | 4/1925 | Bausch et al. |
| 3,653,128 A | 4/1972 | Palmenberg |
| 4,265,023 A | 5/1981 | Frost et al. |
| 4,956,925 A | 9/1990 | East |
| H001006 H * | 12/1991 | Zwicke ...................... 700/298 |
| 5,166,892 A | 11/1992 | Inoue et al. |
| 5,238,366 A | 8/1993 | Ferleger |
| 5,287,631 A | 2/1994 | Stade |

(Continued)

FOREIGN PATENT DOCUMENTS

DE 20 64 075 10/1971

(Continued)

OTHER PUBLICATIONS

Wang Yan-rong et al., "Experimental Evaluation of High Temperature Low Cycle Fatigue/Creep Life of Turbine Blade," Journal of Aerospace Power, vol. 17, No. 4, Oct. 2002 (with English Abstract).

(Continued)

*Primary Examiner*—Robert R Raevis
(74) *Attorney, Agent, or Firm*—Oblon, Spivak, McClelland, Maier & Neustadt, P.C.

(57) ABSTRACT

In order to provide a turbine blade fatigue life evaluating method for quantitively evaluating the fatigue life of a turbine blade, the turbine blade is determined to be within its fatigue life if the creep elongation strain in the longitudinal direction of the turbine blade is less than 0.5% of an initial length, and is determined to exceed its fatigue life if the creep elongation strain is 0.5% or more than the initial length. A turbine blade creep elongation strain measuring apparatus 20 comprises a first fixed end 21, a second fixed end 22, and a dial gauge 24. A dimension in the longitudinal direction is stamped on the surface of a turbine blade.

4 Claims, 6 Drawing Sheets

U.S. PATENT DOCUMENTS

| | | |
|---|---|---|
| 6,272,759 B1 | 8/2001 | Reichenbach et al. |
| 6,568,254 B2 | 5/2003 | Pross |
| 2003/0063270 A1* | 4/2003 | Hunik .................. 356/32 |
| 2003/0170120 A1* | 9/2003 | Grunke et al. ............ 415/174.4 |
| 2004/0060371 A1* | 4/2004 | Barkhoudarian ....... 73/862.331 |

FOREIGN PATENT DOCUMENTS

| | | |
|---|---|---|
| DE | 30 15 058 | 11/1980 |
| DE | 199 62 735 A 1 | 6/2001 |
| JP | 60-043104 | 3/1985 |
| JP | 62-85839 | 4/1987 |
| JP | 11-248605 | 9/1999 |
| JP | 2000-249666 | 9/2000 |
| JP | 2002-349203 | 12/2002 |

OTHER PUBLICATIONS

Zhou Bai-zhuo et al., "Life Prediction Considering Creep and Stress Relaxation for Gas Turbine Engine Hot Section," Journal of Aerospace Power, vol. 18, No. 3, Jun. 2003 (with English Abstract).

Meng Chun-ling et al., "Study of Predict Methods About Creep Break Life of Turbine Blade," Journal of Beijing Technology and Business University (Natural Science Edition), vol. 20, No. 2, Jun. 2002 (with English Abstract).

Li Wei et al., "Research on Experimental Techique for Fatigue-Creep Life of the Turbine Blade in Aeroengine," Journal of Aerospace Power, vol. 16, No. 4, Oct. 2001 (with English Abstract).

* cited by examiner

TURBINE BLADE FATIGUE LIFE EVALUATING METHOD

BACKGROUND OF THE INVENTION

1. Field of the Invention

The present invention relates to a turbine blade fatigue life evaluating method.

2. Description of Related Art

A gas turbine comprises a compressor, a combustor, and a turbine (not shown in the drawings). According to such a gas turbine, compressed air which is compressed in the compressor is supplied to the combustor, and the compressed air is mixed with a fuel which is supplied separately, and combusted. A combustion gas which is generated in the combustor is supplied to the turbine so as to generate a rotational driving force at the turbine.

Figure 6:
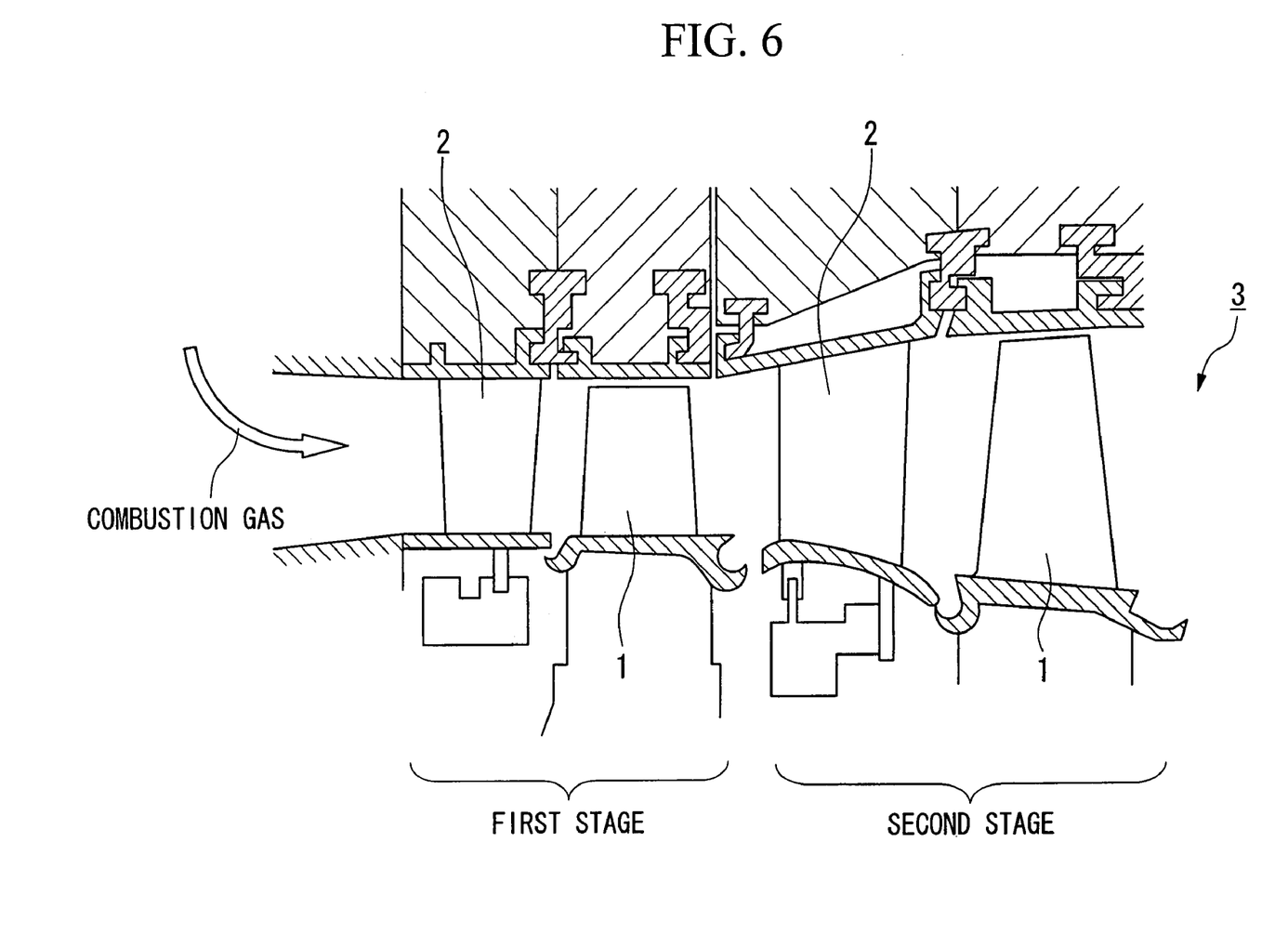
FIG. 6 is a view for explaining an internal structure of a gas turbine.

In FIG. 6, an example of an internal structure of such a turbine is shown. As shown in FIG. 6, in the turbine, a plurality of turbine blades 1 which are disposed circularly on a rotor which is not shown in the drawing, and a plurality of turbine stationary blades 2 which are disposed on a stator around the rotor are disposed alternately in the rotational axis direction (horizontal direction in FIG. 6) of a rotor. Also, a combustion gas flow channel 3 through which the combustion gas passes is formed. The combustion gas which is introduced into the combustion gas flow channel 3 from the combustor rotates the turbine blades 1 and applies a rotational force to the rotor. Such a rotational force rotates a power generator (not shown in the drawing) which is connected to the rotor so as to generate electric power.

However, in such a gas turbine, a method for quantitively evaluating and managing the fatigue life of the turbine blade 1 has not been established; therefore, there is a concern that the entire of the gas turbine may be damaged if a creep defect occurs unexpectedly.

SUMMARY OF THE INVENTION

The present invention was made in consideration of the above-mentioned situation. An object of the present invention is to provide a turbine blade fatigue life evaluating method for evaluating the fatigue life of a turbine blade quantitively.

In order to achieve the above-mentioned object, the present invention provides a turbine blade fatigue life evaluating method, including: measuring an initial length of a turbine blade in an initial state in which a creep elongation strain is zero, marking the initial length on the turbine blade, measuring a post-operation length of the turbine blade after being operated for a predetermined time, estimating a creep elongation strain in a longitudinal direction of the turbine blade based on the initial length and the post-operation length, and evaluating that the turbine blade is within its fatigue life if the creep elongation strain is less than 0.5% of the initial length, or evaluating that the turbine blade exceeds its fatigue life if the creep elongation strain is equal to or more than 0.5% of the initial length.

According to the turbine blade fatigue life evaluating method, by adopting creep elongation strain of 0.5% which is sufficiently lower than 2% as a reference for evaluating the fatigue life, it is possible to rapidly determine the fatigue life of a turbine blade such that a creep defect will not occur in contrast to a conventional turbine blade in which a fracture occurs when the creep elongation strain exceeds 2% due to a sudden decrease in strength.

Specifically, the initial length of the turbine blade in an initial state in which creep elongation strain does not occur is measured in advance. Furthermore, also by measuring the post-operation length of the turbine blade after being operated for a predetermined period of time, and by obtaining the difference between the initial length and the post-operation length, it is possible to obtain a value of post-operation creep elongation strain accurately.

According to the turbine blade fatigue life evaluating method, it is possible to evaluate the fatigue life of a turbine blade quantitively. As a result, it is possible to prevent a problem in that a creep defect suddenly occurs in the turbine blade which causes a serious damage to the entire gas turbine.

According to the turbine blade fatigue life evaluating method, it is possible to determine the creep elongation strain by measuring the elongation with respect to the length of the turbine blade before being operated. Therefore, it is possible to quantitively estimate how many hours remain until the end of the fatigue life based on the value of the creep elongation strain.

The turbine blade fatigue life evaluating method may further include correcting the post-operation length considering a thermal expansion amount of the turbine blade when the creep elongation strain is evaluated.

The turbine blade fatigue life evaluating method may further include setting wall temperature of the turbine blade when the post-operation length is measured, equal to wall temperature of the turbine blade when the initial length is measured.

The turbine blade fatigue life evaluating method may further include estimating how many operable hours are remained until the end of a fatigue life of the turbine blade.

The turbine blade fatigue life evaluating method may further include marking the initial length on the turbine blade.

According to the turbine blade fatigue life evaluating method, the initial length of any one of a plurality of turbine blades in the longitudinal direction can be obtained without taking the time to refer to records such as blueprints or the like. Therefore it is possible to significantly reduce the time for measuring the creep elongation strain for the purpose of performing a fatigue life evaluation of the turbine blade. Additionally, it is possible to prevent, in advance, mistakes from happening due to an oversight such as misidentification of a product number in advance.

The turbine blade fatigue life evaluating method may further include marking wall temperature of the turbine blade which is measured when the initial-dimension is measured, onto the turbine blade.

DETAILED DESCRIPTION OF THE INVENTION

An embodiment of a turbine blade fatigue life evaluating method using a turbine blade creep elongation strain measuring apparatus of the present invention, and a turbine blade which is evaluated by the above-mentioned method are explained with reference to the drawings as follows. Furthermore, the specific structural and functional details disclosed herein are merely representative and do not limit the scope of the invention.

A turbine blade of the present invention, which is not shown in the drawings, is a member which forms a part of a turbine in a gas turbine comprising a compressor, a combustor, and the turbine. A rotor is supported axially so as to be rotatable in the turbine, and a plurality of turbine blades are fixed around the rotor. Also, the turbine introduces a combustion gas which is generated in the combustor into a combustion gas flow channel so as to expand. Furthermore, by rotating the rotor by blowing the combustion gas against each turbine blade, thermal energy of the combustion gas is converted into kinetic rotational energy to generate a driving force.

Figure 1:
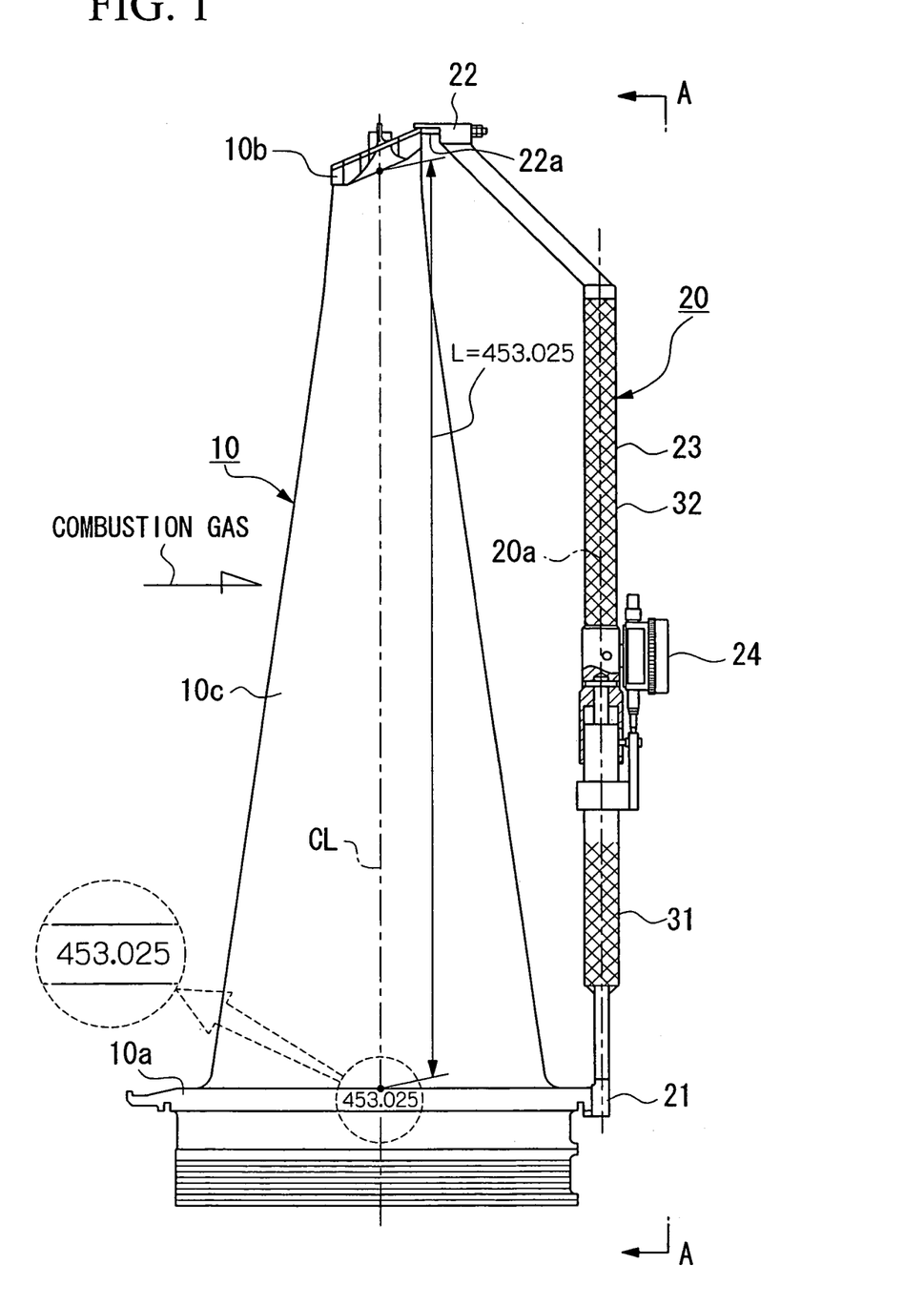
FIG. 1 is a front view of a turbine blade creep elongation strain measuring apparatus in an embodiment of the present invention.

In FIG. 1, a turbine blade 10 according to the present embodiment is shown. The turbine blade 10 comprises an inner shroud 10a which is fixed on the rotor, an outer shroud 10b which forms the combustion gas flow channel in a space between the inner shroud 10a and the outer shroud 10b, and a blade section 10c which is formed between the inner shroud 10a and the outer shroud 10b. Reference symbol CL indicates a central axis line in the center in the width direction of the turbine blade 10.

As shown in FIG. 1, on a surface of the inner shroud 10a of the turbine blade 10, a length L in the longitudinal direction in an initial state before operation is stamped. The length L in the longitudinal direction is the dimension of a straight line along the central axis line CL, which is also the dimension between the outer surface of the inner shroud 10a and the inner surface of the outer shroud 10b. The length L in the longitudinal direction is measured under the condition that the post-production creep elongation strain is 0 (zero) (for example, in FIG. 1, "453.025" indicating "L=453.025 mm" is stamped).

Figure 2:
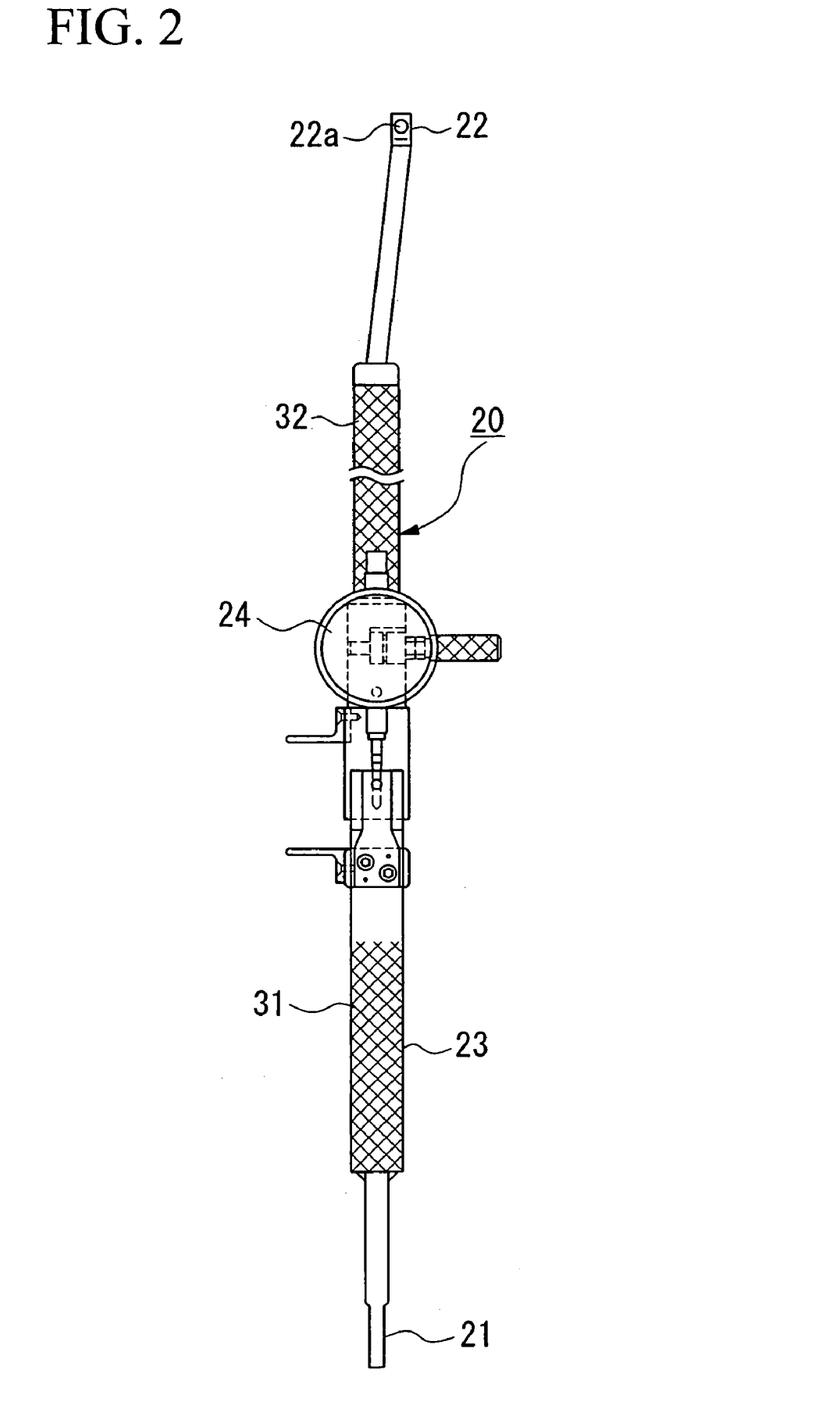
FIG. 2 is a side view of the turbine blade creep elongation strain measuring apparatus which is viewed in the direction indicated by arrow A-A in FIG. 1.

In FIGS. 1 and 2, reference numeral 20 indicates a turbine blade creep elongation strain measuring apparatus which measures the creep elongation strain of the turbine blade 10. The turbine blade creep elongation strain measuring apparatus 20 comprises a first fixed end 21 which can be attached to the inner shroud 10a (one end) of the turbine blade 10, a second fixed end 22 which can be attached to the outer shroud 10b (the other end), a connecting section 23 which connects the first fixed end 21 and the second fixed end 22 and applies a force in a direction such that the first fixed end 21 and the second fixed end 22 are moved closer, and a dial gauge 24 (measuring apparatus) which measures the interval dimension L (i.e., the length in the longitudinal direction L) between the first fixed end 21 and the second fixed end 22.

The first fixed end 21 is a metal member having a nearly "L"-shape when viewed from the side and has a contacting surface which fits the shape of the downstream end section of the inner shroud 10a.

The second fixed end 22 is a metal member having a nearly "L"-shape when viewed from the side and has a contacting surface which fits the shape of the downstream end section of the outer shroud 10b. Reference numeral 22a is an adjusting bolt which adjusts an axis line 20a of the turbine blade creep elongation strain measuring apparatus 20 with respect to the position of the second fixed end 22 in the horizontal direction. By adjusting the position of the adjusting bolt 22a when necessary, it is possible to adjust the axis line 20a of the turbine blade creep elongation strain measuring apparatus 20 such that the center line CL of the turbine blade 10 is parallel with the axis line 20a of the turbine blade creep elongation strain measuring apparatus 20. Therefore, it is possible to handle various shapes of the turbine blade 10.

The connecting section 23 comprises a first rod 31 having the first fixed end 21 which is fixed to one end of the turbine blade, and a second rod 32 which is connected to the other end of the first rod 31 on the same axis and has the second fixed end 22 which is fixed to the other end of the turbine blade.

Figure 3:
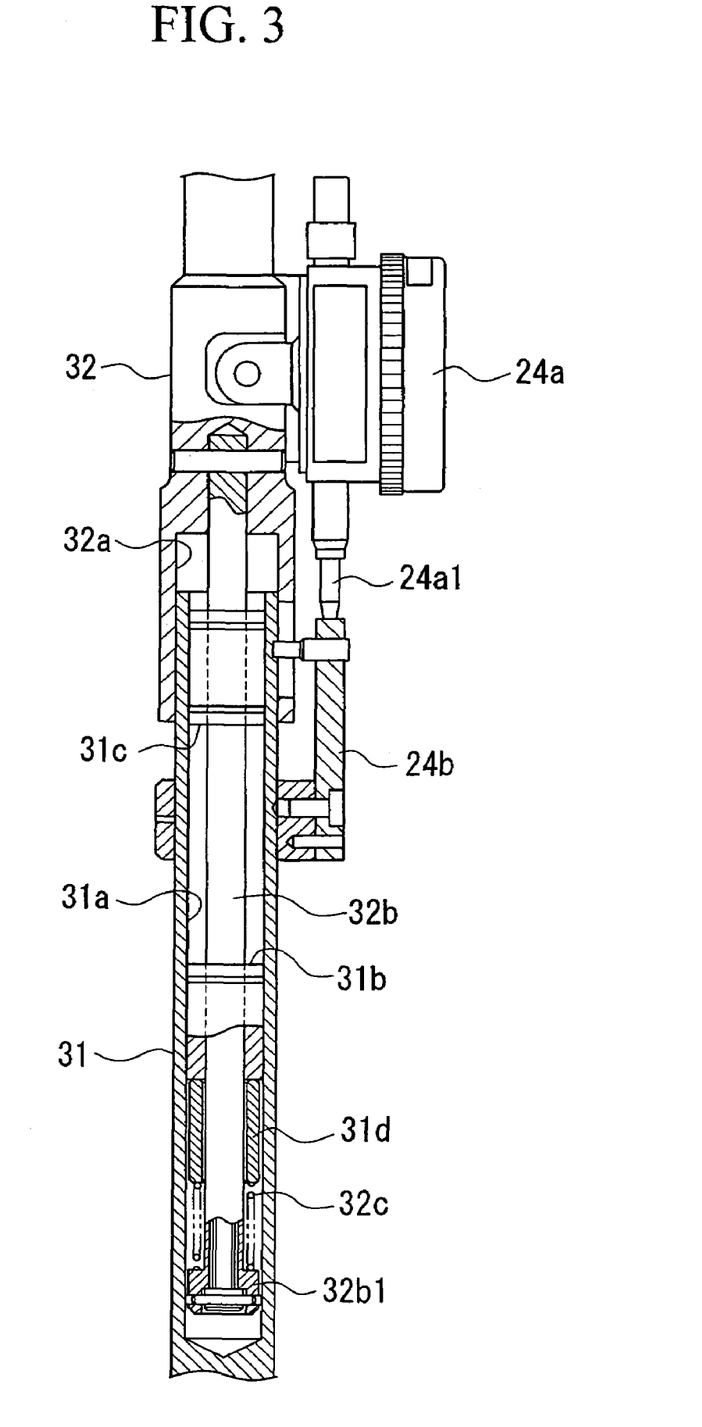
FIG. 3 is a magnified view of a portion of the turbine blade creep elongation strain measuring apparatus.

As shown in FIG. 3, in the connection part of the first rod 31 corresponding to the second rod 32, a deep concave section 31a is formed in the direction of the axial line 20a. In the concave section 31a, a pair of linear bushes 31b and 31c, and a collar 31d are contained. The linear bushes 31b and 31c are cylindrical members and fixed in the concave section 31a at a predetermined interval from each other. The collar 31d is also a cylindrical member which is disposed under the linear bush 31b.

In the connection part of the second rod 32 corresponding to the first rod 31, a deep concave section 32a is formed in the direction of the axis line 20a. In the concave section 32a, the connecting part of the first rod 31 is fit at the same axis so as to slide; thus, the overall length of the connecting section 23 is extendable.

Furthermore, at the connecting part of the second rod 32, the shaft 32b which is inserted into the concave section 31a is fixed. The shaft 32b is inserted through linear bushes 31b and 31c and the collar 31d so as to guide the sliding movement of the second rod 32 toward the first rod 31 in the direction of the axis line 20a.

The tip of the shaft 32b is inserted into a compressing spring 32c as a force applying member. An end of the compressing spring 32c contacts the bottom end of the collar 31d. The other end of the compressing spring 32c contacts a spring stopper 32b1 which is formed in an end of the shaft 32b. Therefore, the first rod 31 and the second rod 32 are forced to be closer by the compressing spring 32c.

As shown in FIG. 3, the dial gauge 24 comprises a dial gauge unit 24a which is fixed on the second rod 32 and a contact section 24b which is fixed on the first rod 31, and has a needle 24a1 of the dial gauge unit 24a which contacts the contact section 24b.

The dial gauge unit 24a can measure the interval dimension L between the first fixed end 21 and the second fixed end 22 accurately by extension of the needle 24a1 caused by contact with the contact section 24b when the interval between the first rod 31 and the second rod 32 increases and decreases. For the dial gauge unit 24a, not only a gauge which determines the interval dimension L as an absolute value but also a gauge which measures a variance of the dimension (difference) with respect to a predetermined reference dimension (for example, the interval dimension L in an initial state) can be employed.

A turbine blade fatigue life evaluating method using the turbine blade creep elongation strain measuring apparatus 20 having the above-mentioned structure is explained as follows. First, in the turbine blade 10 in an initial state, the first fixed end 21 is engaged with the inner shroud 10a, and while the interval between the first rod 31 and the second rod 32 is extended while opposing a force which is applied by the compressing spring 32, the second fixed end 22 is engaged with the outer shroud 10b. Consequently, the compressing spring 32c automatically adjusts the interval between the first fixed end 21 and the second fixed end 22 so as to be a minimum. Accordingly, the dial gauge unit 24a accurately indicates the interval dimension L automatically. The measurement operation in an initial state needs to be performed only once, and the measurement results should preferably be stamped on the surface of the turbine blade 10 as mentioned above.

When performing an evaluation of the fatigue life of a post-operation turbine blade 10 after a predetermined period of time, a measurement may be performed by the same method as mentioned above. By obtaining the difference from the measurement results under conditions of an initial state, it is possible to determine a post-operation creep elongation strain after a predetermined period of time.

When evaluating such a creep elongation strain, it is preferable to adopt a method wherein a turbine blade is determined to be within its fatigue life if the creep elongation strain in a longitudinal direction of the turbine blade is less than 0.5% of the initial length, and the turbine blade is determined to have exceeded its fatigue life if the creep elongation strain in the longitudinal direction of the turbine blade is 0.5% or more than the initial length.

In an ordinary turbine blade, the turbine blade rapidly decreases in strength and fractures when the creep elongation strain exceeds 2%. Therefore, by adopting a creep elongation strain such as 0.5% which is lower than 2% as a reference for evaluating the fatigue life, it is possible to determine the fatigue life of the turbine blade such that a creep defect of the turbine blade 10 will not occur.

Also, by performing such a measurement operation for each operation period, it is possible to determine the changing behavior of the creep elongation strain over time. Thus, according to such changing behavior, it is possible to estimate how many hours remain until the end of the fatigue life.

According to the turbine blade fatigue life evaluating method using such a turbine blade creep elongation strain measuring apparatus 20, it is possible to evaluate fatigue life of the turbine blade 10 quantitively. Therefore, it is possible to prevent a problem in that a creep defect suddenly occurs in a turbine blade which causes serious damage to the entire of the gas turbine.

Also, by stamping the measurement result under an initial condition on the surface of the turbine blade 10 according to the present invention, in a subjected measurement, it is possible to know the fatigue life of a turbine blade without taking the time to refer to records such as blueprints. Therefore, it is possible to reduce the time for measuring the creep elongation strain for the purpose of performing a fatigue life evaluation of the turbine blade 10. Additionally, because the measurement results which are desired to be known are stamped on the surface of the turbine blade, it is possible to prevent mistakes from happening in advance due to an oversight such as misidentification of a product number.

Figure 4:
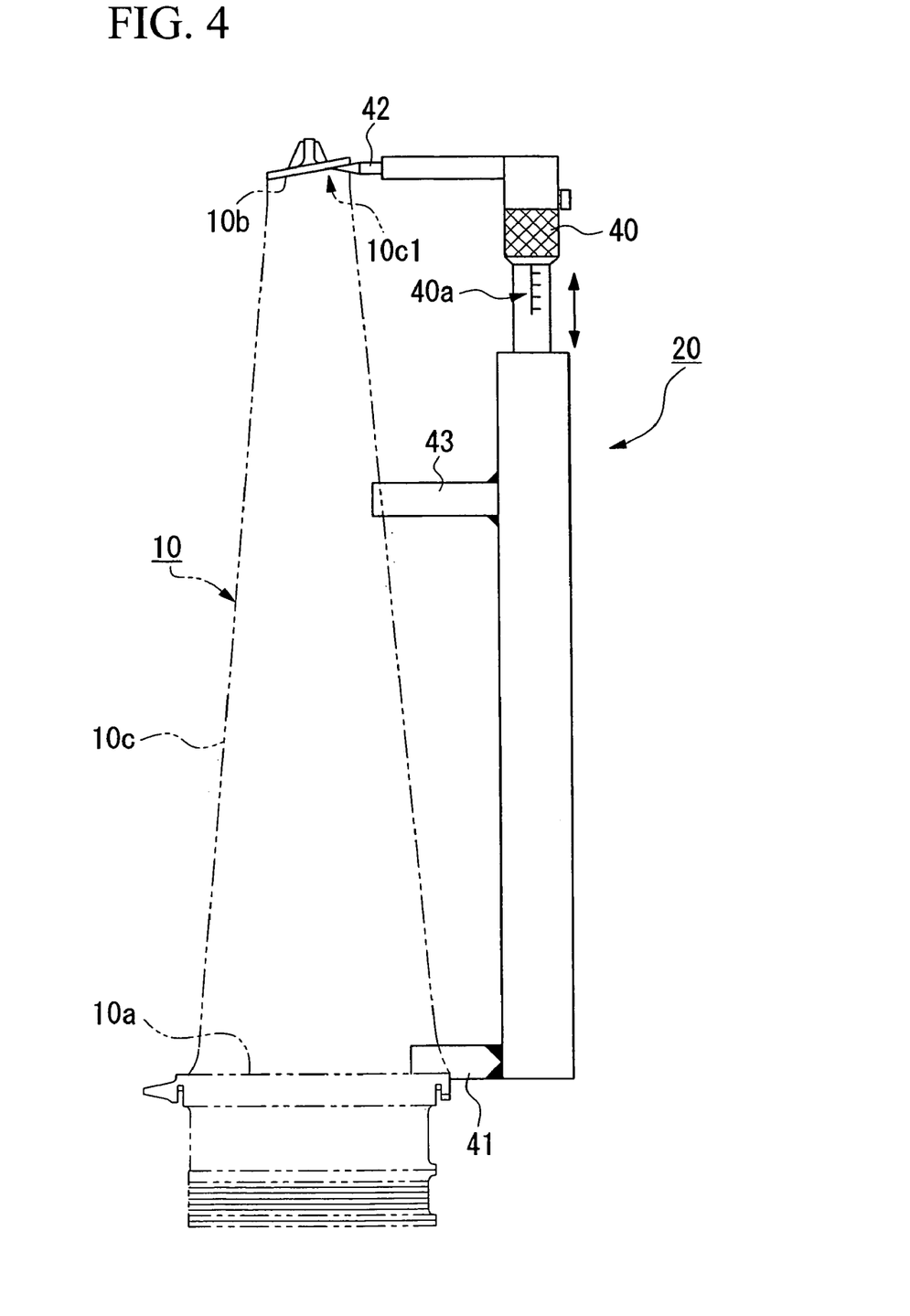
FIG. 4 is a front view of the turbine blade creep elongation strain measuring apparatus in a modified embodiment of the present invention.

A modified embodiment of the turbine blade creep elongation strain measuring apparatus 20 is explained with reference to FIGS. 4 and 5. The modified embodiment as shown in FIG. 4 is different from the above-mentioned embodiment particularly in that the turbine blade creep elongation strain measuring apparatus 20 is fixed on the turbine blade 10 by a different method and a micrometer 40 is provided in place of the dial gauge 24. That is, in the present modified embodiment, the turbine blade creep elongation strain measuring apparatus 20 is supported by a three-point-supporting method using a first fixed end 41 which contacts a flat upper surface of the downstream end of the inner shroud 10a, a second fixed end 42 having a tip which is inserted into a dimple 10c1 which is formed in the downstream edge of the blade section 10c and near the outer shroud 10b, and a third fixed end 43 being positioned between the first fixed end 41 and second fixed end 42 so as to contact the downstream edge of the blade section 10c. In addition, the measurement results by the micrometer 40 can be indicated by a scale mark 40a.

Figure 5:
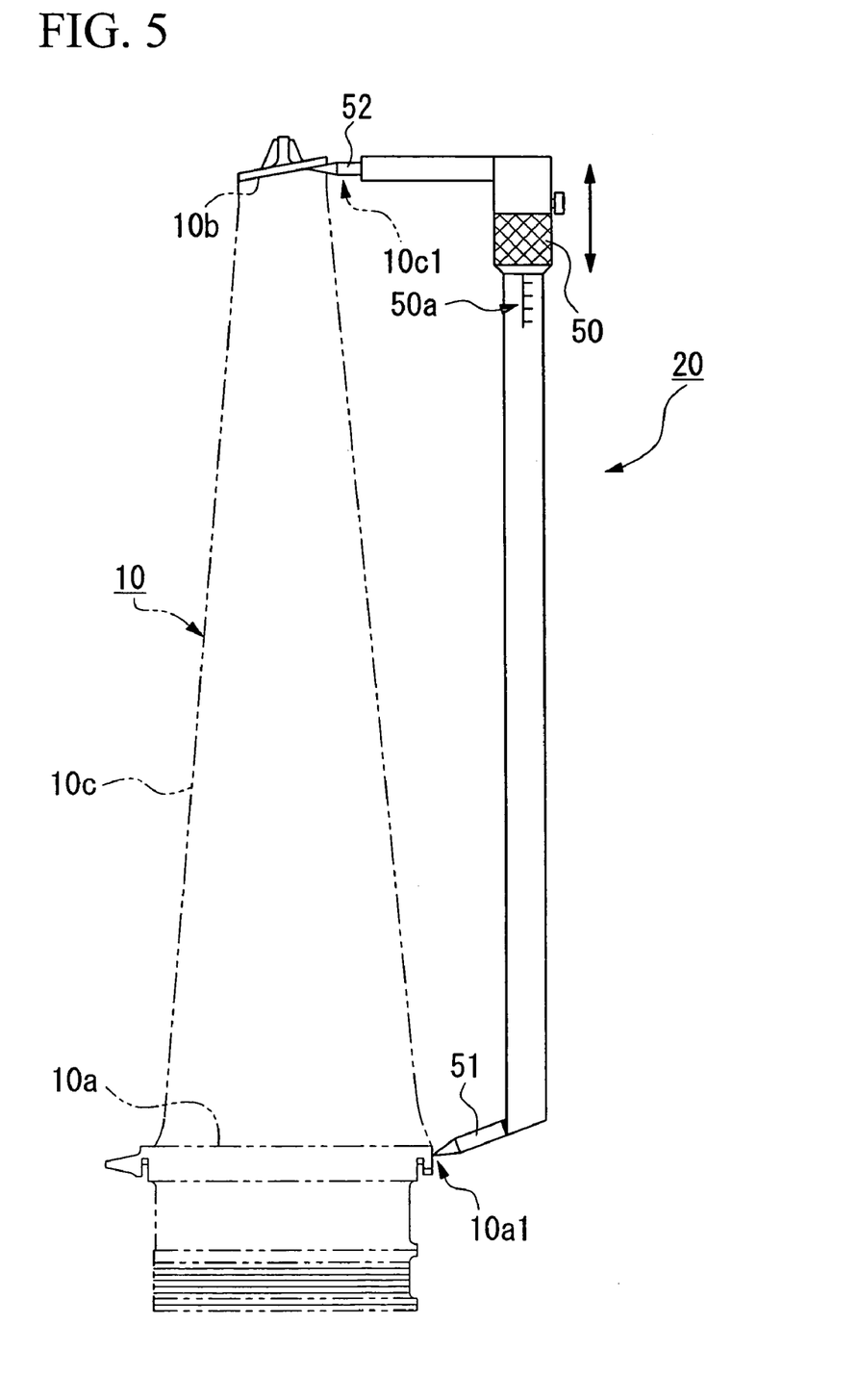
FIG. 5 is a front view of the turbine blade creep elongation strain measuring apparatus in another modified embodiment of the present invention.

The modified embodiment of the turbine blade creep elongation strain measuring apparatus 20 as shown in FIG. 5 is different from the above-mentioned embodiment particularly in that the turbine blade creep elongation strain measuring apparatus 20 is fixed on the turbine blade 10 by a different method and a micrometer 50 is provided in place of the dial gauge 24. That is, in the present modified embodiment, the turbine blade creep elongation strain measuring apparatus 20 is supported by a first fixed end 51 having a tip which is inserted into a dimple 10a1 which is formed in the downstream edge of the inner shroud 10a and a second fixed end 52 having a tip which is inserted into the dimple 10c1 which is formed in the downstream edge of the blade section 10c and near the outer shroud 10b. In addition, the measurement results by the micrometer 50 can be indicated by a scale mark 50a.

Here, it is preferable that more precise result can be obtained when a measurement is performed under condition that an influence of thermal expansion in the turbine is taken into account in the above embodiment and modified embodiments.

That is, in a first measurement in which a creep expansion distortion is zero, a temperature in a wall of the turbine blade 10 is recorded (it is preferable that the above longitudinal direction dimension L and the temperature in a wall are marked on the inner shroud 10a on the turbine blade 10.) Consequently, a temperature in a wall and the longitudinal direction dimension L are measured when evaluating a fatigue life of the turbine blade 10. As long as the temperature in a wall is the same as the temperature in the wall in a first measurement, it is not necessary to correct the temperature. When there is a difference between the measured temperatures, correction is made in taking the thermal expansion amount into consideration. That is, necessary correction is determined by calculating the thermal expansion amount according to a raw data of the turbine blade 10. In addition, such a thermal expansion amount is deducted from the measurement result of the longitudinal direction dimension L; thus, it is possible to synchronize the wall-temperature condition with that in the first measurement. It is also acceptable if the wall temperature is adjusted each time the measurement is performed according to the temperature obtained in the first measurement. In such a case, it is possible to skip a process for correcting the thermal expansion amount.

What is claimed is:

1. A turbine blade fatigue life evaluating method, comprising:
   measuring an initial length of a turbine blade in an initial state in which a creep elongation strain is zero;
   marking the initial length on the turbine blade;
   marking wall temperature of the turbine blade which is measured when the initial-dimension is measured, onto the turbine blade;
   measuring a post-operation length of the turbine blade after being operated for a predetermined time;
   estimating a creep elongation strain in a longitudinal direction of the turbine blade based on the initial length and the post-operation length; and
   evaluating that the turbine blade is within its fatigue life if the creep elongation strain is less than 0.5% of the initial length, or evaluating that the turbine blade exceeds its fatigue life if the creep elongation strain is equal to or more than 0.5% of the initial length.

2. The turbine blade fatigue life evaluating method according to claim 1, further comprising correcting the post-operation length considering a thermal expansion amount of the turbine blade when the creep elongation strain is evaluated.

3. The turbine blade fatigue life evaluating method according to claim 1, further comprising setting wall temperature of the turbine blade when the post-operation length is measured, equal to wall temperature of the turbine blade when the initial length is measured.

4. The turbine blade fatigue life evaluating method according to claim 1, further comprising estimating how many operable hours are remained until the end of a fatigue life of the turbine blade.

* * * * *